(12) United States Patent
Yoshida

(10) Patent No.: US 7,167,292 B2
(45) Date of Patent: Jan. 23, 2007

(54) SPECTROSCOPE AND CONFOCAL SCANNING MICROSCOPE COMPRISING THEREOF

(75) Inventor: Takehiro Yoshida, Tokyo (JP)

(73) Assignee: Olympus Corporation, Tokyo (JP)

( * ) Notice: Subject to any disclaimer, the term of this patent is extended or adjusted under 35 U.S.C. 154(b) by 36 days.

(21) Appl. No.: 10/765,966

(22) Filed: Jan. 29, 2004

(65) Prior Publication Data
US 2005/0141082 A1 Jun. 30, 2005

(30) Foreign Application Priority Data
Feb. 3, 2003 (JP) .................... P2003-026043

(51) Int. Cl.
G02B 21/00 (2006.01)
G02B 26/02 (2006.01)

(52) U.S. Cl. .................... 359/227; 359/370; 356/310

(58) Field of Classification Search ............ 359/232, 359/370; 356/310
See application file for complete search history.

(56) References Cited

U.S. PATENT DOCUMENTS

| | | | | |
|---|---|---|---|---|
| 2,964,998 A * | 12/1960 | Middlestadt | ............. | 359/232 |
| 3,393,959 A * | 7/1968 | Van Den Broek | .......... | 359/232 |
| 3,639,039 A * | 2/1972 | Rhodes, Jr. | ................ | 359/559 |
| 5,192,980 A * | 3/1993 | Dixon et al. | ............... | 356/326 |
| 5,295,017 A * | 3/1994 | Brown | ..................... | 359/350 |
| 5,600,620 A * | 2/1997 | Ohguri | ..................... | 369/118 |
| 5,751,420 A * | 5/1998 | Iida et al. | ................... | 356/328 |
| 6,411,381 B1* | 6/2002 | Aspnes et al. | ............. | 356/326 |
| 6,459,484 B1* | 10/2002 | Yokoi | ........................ | 356/318 |
| 6,510,001 B1* | 1/2003 | Engelhardt et al. | ........ | 359/385 |
| 6,801,359 B1* | 10/2004 | Engelhardt et al. | ........ | 359/368 |
| 2002/0021440 A1* | 2/2002 | Knebel | ....................... | 356/308 |
| 2003/0071226 A1* | 4/2003 | Engelhardt et al. | ...... | 250/458.1 |
| 2003/0095329 A1* | 5/2003 | Englehardt | .................. | 359/388 |
| 2004/0195497 A1* | 10/2004 | Sasaki | ....................... | 250/234 |
| 2004/0264515 A1* | 12/2004 | Chang et al. | ................. | 372/20 |

FOREIGN PATENT DOCUMENTS

JP 08-043739 2/1996
WO WO 99/39165 8/1999

* cited by examiner

Primary Examiner—Mark A. Robinson
Assistant Examiner—Mark Consilvio
(74) Attorney, Agent, or Firm—Kenyon & Kenyon LLP (57) ABSTRACT

The invention provides a spectroscope that provides variable masks 24a and 24b that limits the light path of separated light beams in the spectrum direction and composite masks 24c and 24d that limit the same in the perpendicular direction. In addition, the invention provides a confocal scanning microscope that equipped with this spectroscope.

7 Claims, 9 Drawing Sheets

PRIOR ART

US 7,167,292 B2

SPECTROSCOPE AND CONFOCAL SCANNING MICROSCOPE COMPRISING THEREOF

BACKGROUND OF THE INVENTION

1. Field of the Invention

The present invention relates to a spectroscope that performs spectrum resolution of a light beam to extract a separated light beam having an arbitrary wavelength, and a confocal scanning microscope providing this spectroscope.

Priority is claimed on Japanese Unexamined Patent Application, First Publication No. 2003-026043, the content of which is incorporated herein by reference.

2. Description of Related Art

Conventionally, a confocal scanning microscope is known in which an observation object is excited by illuminating it using a laser beam, and at the same time, allows fluorescence observation by displaying the fluorescent light from this observation object as an image (for example, refer to Japanese Unexamined Patent Application, First Publication No. Hei 8-43739).

In a confocal scanning microscope, a spectroscope that extracts a separated light beam having a particular wavelength from this fluorescent light is provided for observation, and in terms of increasing the precision of the resolution, avoiding the capture of side lobes of the separated light beams having other wavelengths and the like in the separated light beam to be extracted is desirable.

In order to solve this problem, a structure is used in which the shape of the small aperture that focuses the light beam (fluorescent light) before spectrum resolution is square (refer, for example, to Japanese Unexamined Patent Application, First Publication No. 2002-502050). This will be explained using FIG. 12.

Figure 12:
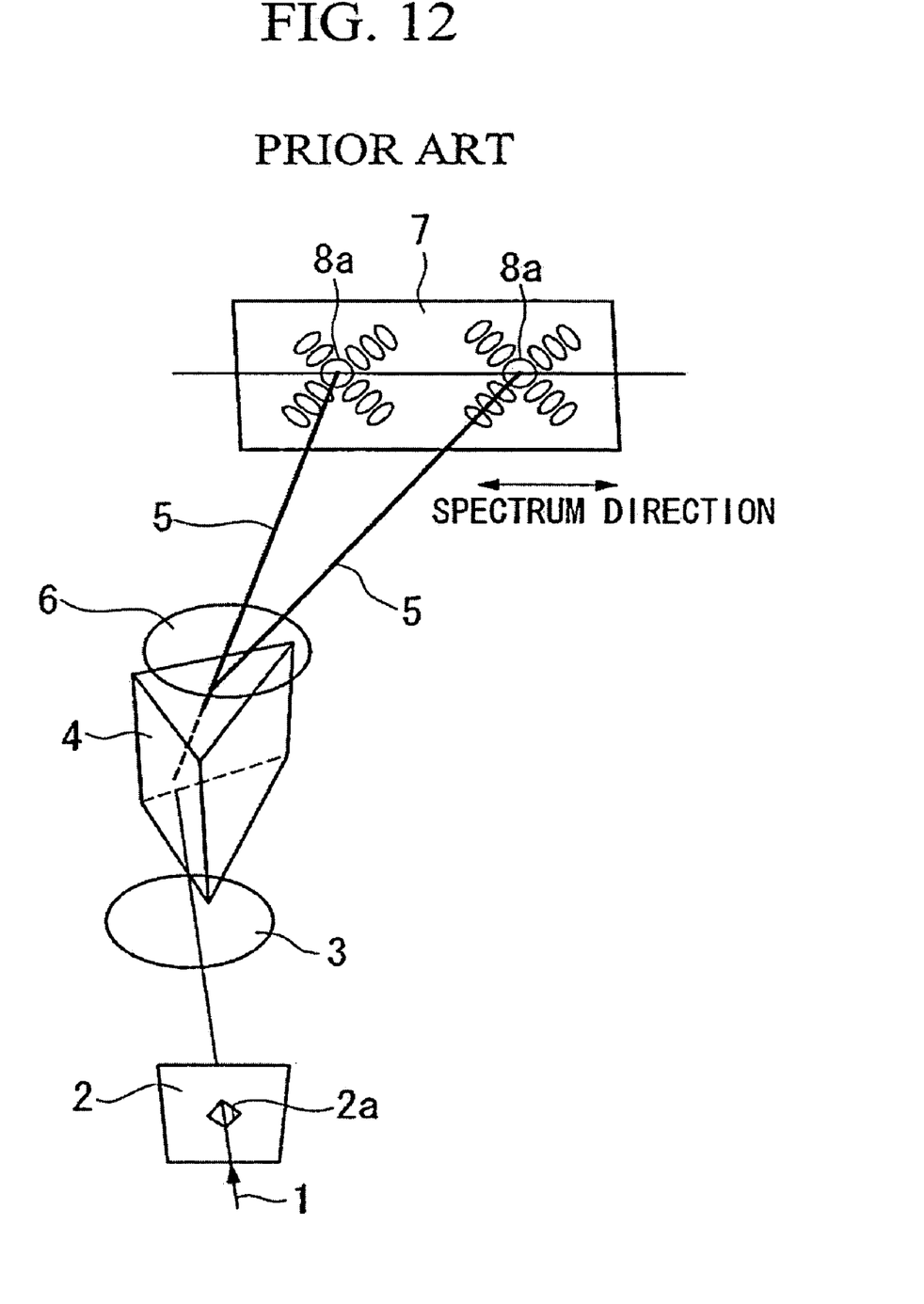
FIG. 12 is a perspective drawing for explaining a conventional spectroscope.

As shown in the figure, the light beam 1 from the observation object (not illustrated) first passes through the small aperture 2 in which the polygonal passage hole 2a is formed, and then is incident on the prism 4 after passing through the focusing optical system 3. Thereby, this light beam 1 is resolved into the separated light beams 5 of various wavelengths. The resolved separated light beams 5 pass through another focusing optical system 6 to build up images on the dispersion plane 7. In this manner, in the image formed on the dispersion plane 7, side lobes are arranged in an X shape centered on the spot 8a having the highest optical intensity, and arrayed in the spectrum direction (in the figure, only two are illustrated for the explanation). Thereby, it becomes possible to extract the desired separated light beams by blocking from among these images those whose separated light beams do not have the necessary wavelength in the spectrum direction.

SUMMARY OF THE INVENTION

A spectroscope of the present invention resolves a light beam into separated light beams having various wavelengths, and selects and extracts a separated light beam having an arbitrary wavelength from among these separated light beams. This spectroscope provides masks that limit a transmission area of each of the separated light beams in a spectrum direction and masks that limit the transmission area of each of the separated light beams in a direction perpendicular to the spectrum direction, where the spectrum direction denotes a direction of the arrangement of these separated light beams when viewed against the line of the resolved separated light beams.

It is preferable that this spectroscope provides a square small aperture that focuses the light beam before resolution, and a direction of one of diagonals of the small aperture is parallel to the spectrum direction.

It is preferable that this spectroscope provides an adjustment device that adjusts the relative positions of each of the masks and each of the separated light beams that propagates towards these masks.

It is preferable that this spectroscope provides a reflection preventing constitution provided on a shielding surface on one or both of the masks on which the separated light beams are impinged.

In this spectroscope, it is preferable that a shielding surface on one or both of the masks that is impinged by the separated light beams is slanted so as to avoid facing an optical device adjacent to the shielding surface.

In this spectroscope, it is preferable that: lenses disposed in opposition are adjacent to the masks; and surfaces of the lenses that are opposite to the masks have a convex shape that is convex towards these masks.

A confocal scanning microscope of the present invention resolves a light beam from an observation object into separated light beams of various wavelengths, selects a separated light beam having an arbitrary wavelength from among these separated light beams, and receives the selected separated light beam at a photodetector. This confocal scanning microscope provides the spectroscope in any one of the above description, between the light paths from the observation object towards the photodetector.

DETAILED DESCRIPTION OF THE INVENTION

Figure 1:
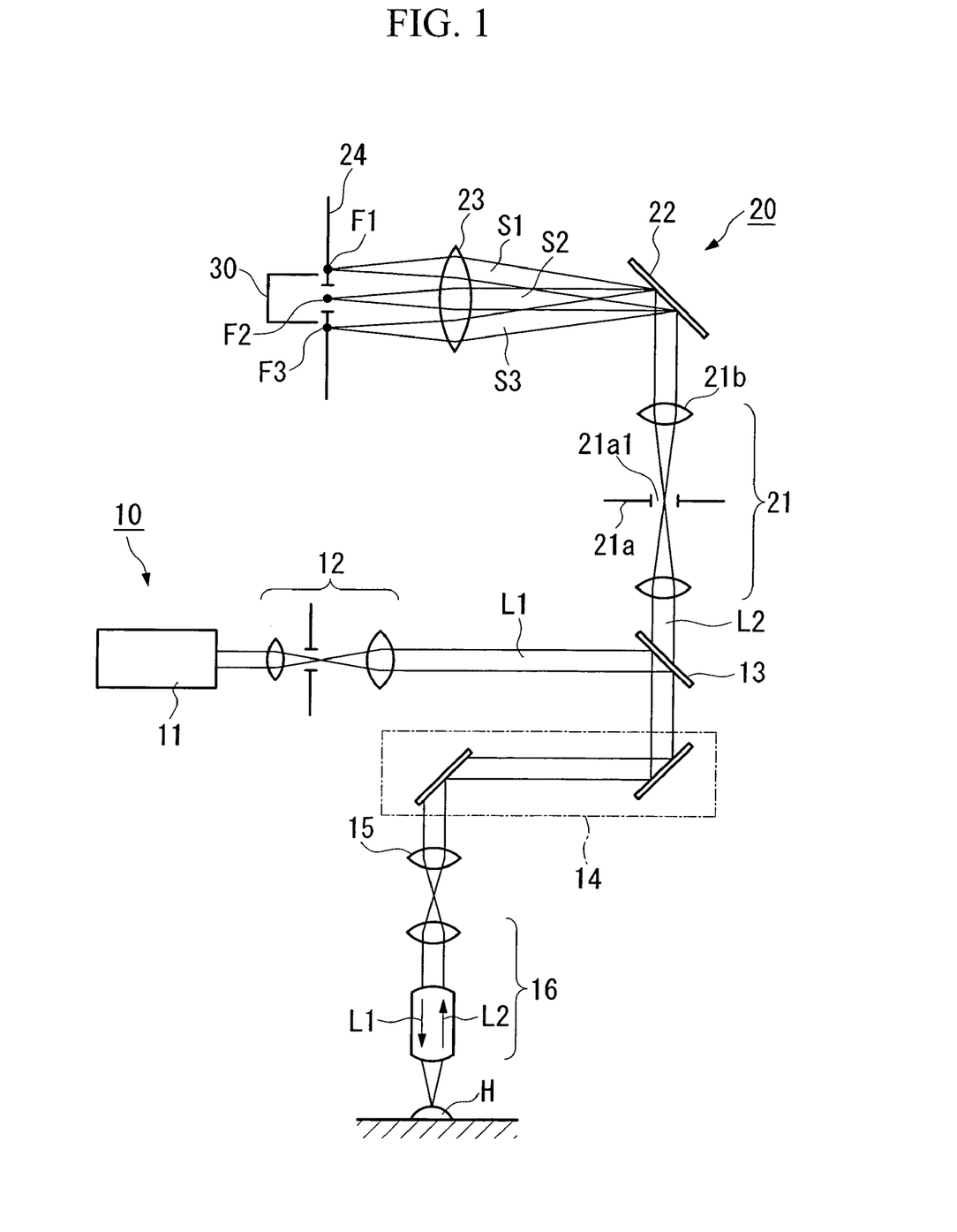
FIG. 1 is a drawing showing a first embodiment of the confocal scanning microscope providing a spectroscope of the present invention, and is an explanatory drawing showing the device arrangement along a light path.
Figure 2:
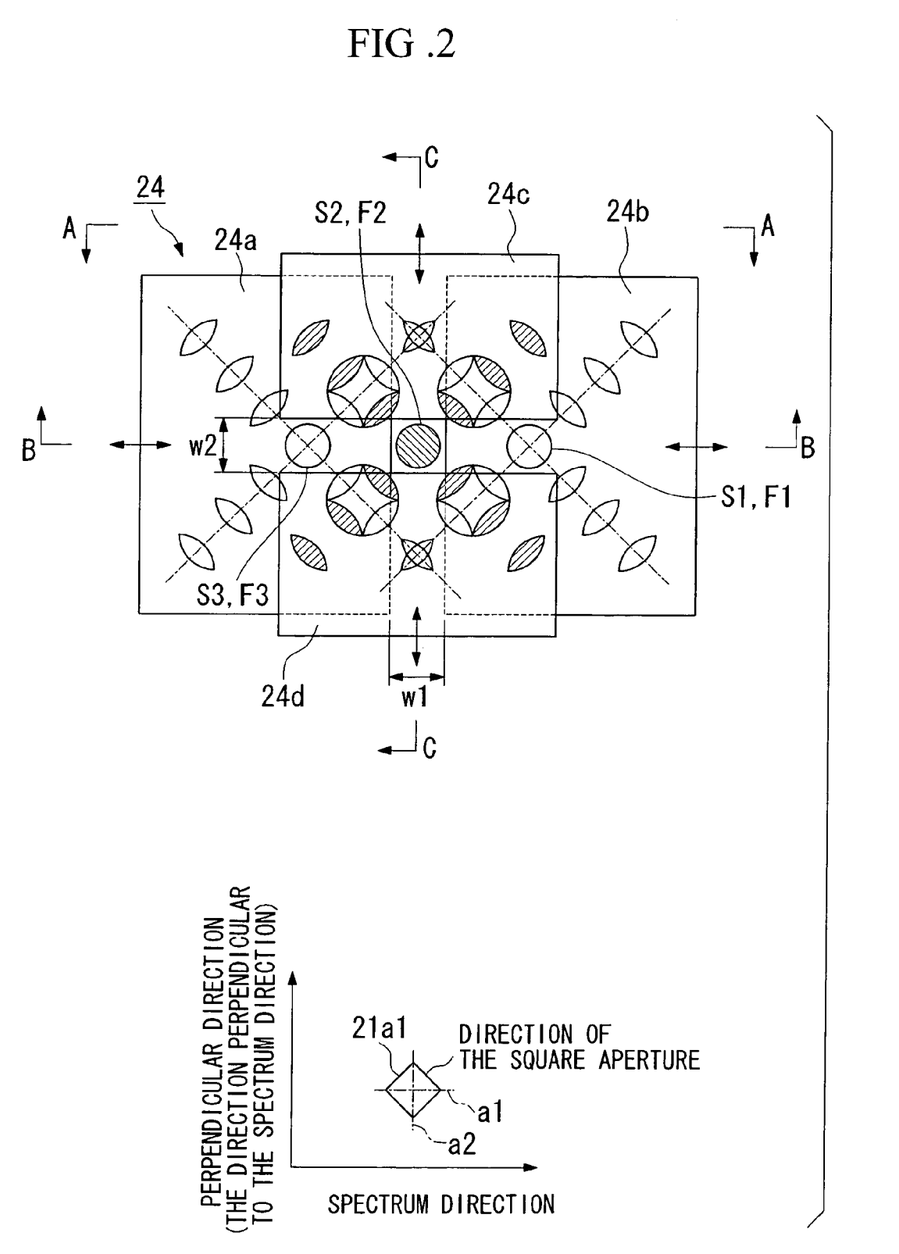
FIG. 2 is a drawing showing a masking apparatus of the same spectroscope. The upper drawing is a frontal drawing where this masking apparatus is viewed along the line of the light path, and the lower drawing is an explanatory drawing for explaining the shape of a small aperture.
Figure 3:
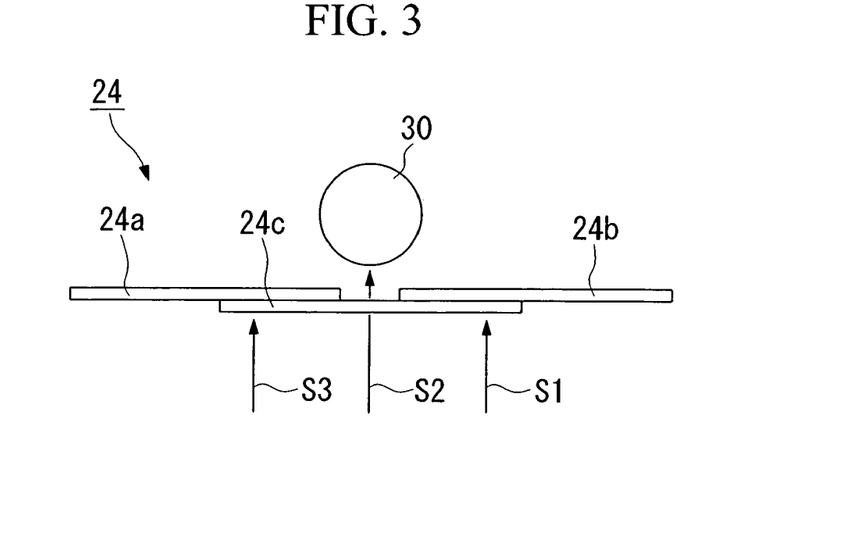
FIG. 3 is a drawing showing the same masking apparatus of the same spectroscope, and is a planar drawing viewed along the arrow A—A in FIG. 2.
Figure 4:
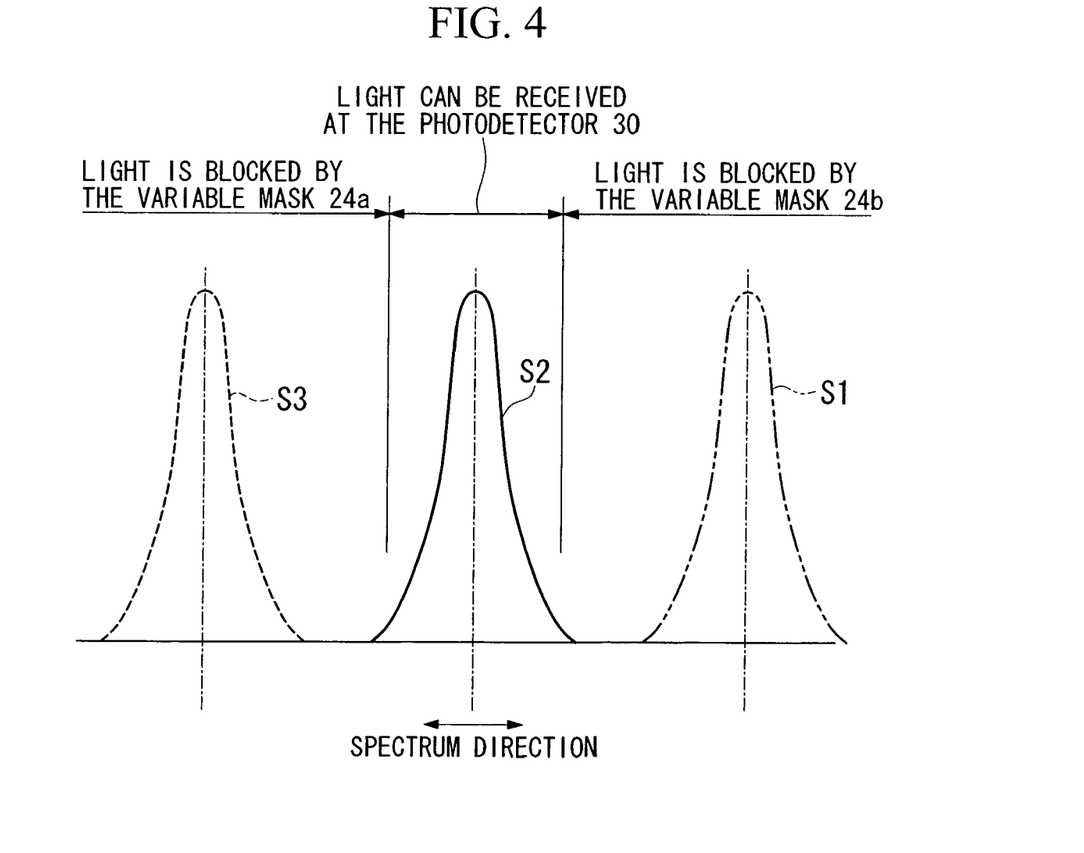
FIG. 4 is a drawing where the incident light intensity distribution is viewed on the cross-section B—B in FIG. 2 in the case that a square shape is used for the shape of the small aperture.
Figure 5:
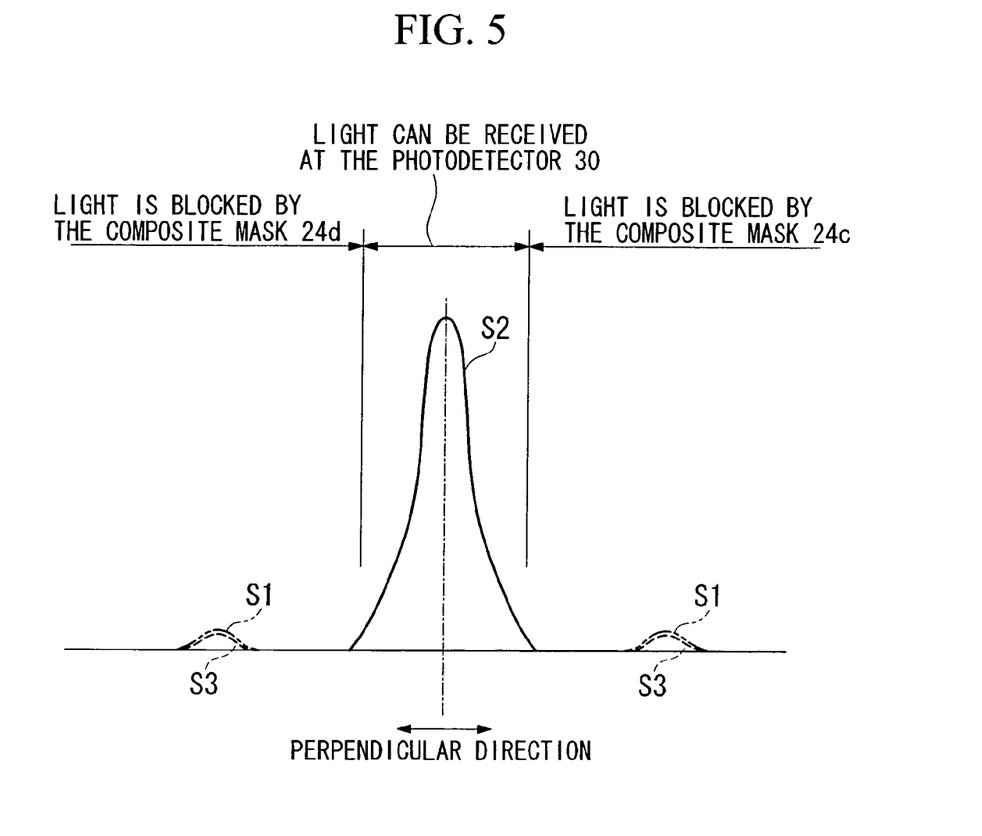
FIG. 5 is a drawing wherein the same incident light intensity distribution is viewed on the cross-section C—C in FIG. 2.

Each embodiment of a spectroscope of the present invention and a confocal scanning microscope providing the same will be explained below with reference to the figures. However, of course the present invention is not limited by these embodiments. First, the first embodiment of the present invention will be explained with reference to FIG. 1 to FIG. 5. FIG. 1 is an explanatory drawing showing a device arrangement along the light path of the confocal scanning microscope providing the spectroscope of the present invention. FIG. 2 is a drawing showing a masking apparatus of this spectroscope. The upper drawing is a frontal drawing where this masking apparatus is viewed along the line of a light path, and the lower drawing is an explanatory drawing for explaining the shape of the small aperture. FIG. 3 is a drawing showing the same masking apparatus of this spectroscope, and is a planar drawing viewed along the arrow A—A in FIG. 2. FIG. 4 is a drawing in which an incident light intensity distribution is viewed on the cross-section B—B in FIG. 2 when a square shape is used for the shape of the small aperture. FIG. 5 is a drawing wherein the same incident light intensity distribution is viewed on the cross-section C—C in FIG. 2.

As shown in FIG. 1, the confocal scanning microscope of the present embodiment provides a laser beam illumination apparatus 10 that illuminates a sample H (the observation object) using laser beam L1; a spectroscope 20 that resolves a fluorescent light L2 (luminous flux) emitted from the sample H that has been illuminated from the laser beam L1 from the laser beam illumination apparatus 10 into the separated light beams S1 to S3 having various wavelengths, and selects separated light beam S2 having an arbitrary wavelength from among the separated light beams S1 to S3; and a photodetector device 30 that receives the separated light beam S2 having the wavelength selected by the spectroscope 20.

The laser beam illumination apparatus 10 is formed by providing a laser beam source 11; a beam expander 12; a dichroic mirror 13; an X-Y scanning optical system (scanner) 14; a pinhole projection lens 15; and a microscope 16. In the laser beam illumination apparatus 10, first, a laser beam L1 having a single wavelength and emitted from the laser beam source 11 is reflected by the dichroic mirror 13 after passing through the beam expander 12, and is then emitted into the X-Y scanning optical system 14. The laser beam L1 is emitted towards the sample H after passing through the pinhole projection lens 15 and the microscope 16. The sample H that is illuminated by the laser beam L emits fluorescent light L2 towards the microscope 16. The fluorescent light L2 passes through the microscope 16, the pinhole projection lens 15, and the X-Y scanning optical system 14, and is emitted towards the dichroic mirror 13. The dichroic mirror 13 allows only the fluorescent light L2 to pass through towards the spectroscope 20.

The spectroscope 20 is formed by providing a confocal optical system 21; a flat grating 22; a lens (system) 23; and a masking apparatus 24. In the spectroscope 20, the fluorescent light L2 that has passed through the dichroic mirror 13 is introduced into the confocal optical system 21. In the confocal optical system 21, the introduced fluorescent light L2 is focused in a small aperture 21a1 formed in a confocal aperture 21a, and then is made parallel light by a single lens 21b. The small aperture 21a1 has a square shape such as a rhomboid or the like. The fluorescent light L2 that has become the parallel light is emitted to the flat grating 22, and resolved into a plurality of separated light beams S1 to S3 of parallel light having various wavelengths (in FIG. 1, there are three separated light beams in order to simplify the explanation). These separated light beams S1 to S3 propagating towards the lens (system) 23 form focal points F1 to F3 on the same imaginary plane such that they are separated by a predetermined distance.

The masking apparatus 24 can extract the separated light beam S2 having a desired wavelength band and wavelength width by adjusting the position and the width of the transmittable region of the light, and thereby enables reception by the photodetector device 30. Below, the details of the masking apparatus 24 will be explained. In the following explanation, when viewed against each of the separated light beams S1 to S3, the expression "spectrum direction" denotes the direction along the arrangement of the separated light beams S1 to S3 and the expression "perpendicular direction" denotes the direction that is perpendicular to this spectrum direction.

As shown in FIG. 2 and FIG. 3, the masking apparatus 24 is formed by providing a pair of variable masks 24a and 24b (masks) that limit the light path of each of the separated light beams S1 to S3 in the spectrum direction; a pair of composite masks 24c and 24d (masks) that limit the same in the perpendicular direction; and an driving device (adjustment device; not illustrated) that adjusts the relative positions between the variable masks 24a and 24b and the composite masks 24c and 24d, and each of the separated light beams S1 to S3 by independently positioning the variable masks 24a and 24b and the composite masks 24c and 24d.

Each of the variable masks 24a and 24b can be independently moved in the spectrum direction (the left-to-right direction in the figure). Therefore, by moving the absolute positions of the variable masks 24a and 24b in the spectrum direction, it becomes possible to adjust the wavelength band of the fluorescent light received by the photodetector device 30. In addition, by controlling the gap w1 between the variable masks 24a and 24b, it becomes possible to adjust the wavelength width of the fluorescent light received by the photodetector device 30.

The composite masks 24c and 24d can independently move in the perpendicular direction (the top-to-bottom direction of FIG. 2) (It is possible to move both in the perpendicular direction while preserving the gap of the aperture portion between the composite masks 24c and 24d at a constant width). Therefore, by moving the absolute position of these variable masks 24a and 24b in the perpendicular direction, it becomes possible to adjust the transmission position of the fluorescent light in the perpendicular direction. In addition, by controlling a gap w2 between these variable masks 24a and 24b, it becomes possible to adjust the height dimension through which the fluorescent light can be transmitted in the perpendicular direction.

Therefore, by controlling the variable masks 24a and 24b and the composite masks 24c and 24d using the driving device, it is possible to freely adjust position and size (both the width dimension and the height dimension) of the square aperture part, fluorescent light having a desired wavelength band and wavelength width can be selected and received by the photodetector device 30, and thereby it becomes possible to block reliably the other fluorescent light.

The relationship between the effects of this masking function and the shape of the small aperture 21a1 will be explained in the following. As described above, the small aperture 21a1 has a square shape such as a rhomboid or the like. As shown in the lower part of FIG. 2, the direction of one among the diagonal lines (a diagonal line a1) in this square and the spectrum direction are parallel to each other, and the direction of the other diagonal line (a diagonal line a2) and the perpendicular direction are parallel to each other.

By adopting square shape for the shape of the small aperture 21a1, the pattern of the side lobes produced by each of the separated light beams S1 to S3 after resolution can be arranged in an X-shape as shown in the upper part of FIG. 2. In other words, when viewed on a cross-section area that is perpendicular to the separated light beams S1 to S3, it is possible to arrange the separated light beams S1 to S3 along two linear directions which are slanted in the spectrum direction and intersect each other. Therefore, it becomes possible to prevent the side lobes from being arranged in the spectrum direction, which is the direction of the arrangement of each of the focal points F1 to F3. In addition, at the main spot of each of the separated light beams S1 to S3 (the portion having the highest optical intensity formed at the positions of each of the focal points F1 to F3), it is possible to reduce reliably the capture of the side lobes of the other adjacent separated light beams.

By making the direction of the square of the small aperture 21a1 with respect to the spectrum direction as described above, it is possible to make the direction of the arrangement of the main spots (the portion having the highest intensity formed at the positions of each of the focal points F1 to F3) of each of the separated light beams S1 to S3 be aligned with the direction of the slit formed between the composite masks 24c and 24d. Therefore, the side lobes that would pass through the slit formed between the variable masks 24a and 24b can be blocked by the composite masks 24c and 24d, whose positions can similarly be adjusted in the perpendicular direction.

As explained above, by providing the masking apparatus 24, the spectroscope 20 of the present embodiment can block both the main spots of the separated light beams S1 and S3 that are not the objects of measurement and the side lobes thereof along with the scattered component by the variable masks 24a and 24b in the spectrum direction. More precisely, the optical intensity dispersion of each of the separated light beams S1 to S3 in the spectrum direction is as shown in FIG. 4, and the side lobes in this direction can be ignored because they are extremely small. By adjusting the absolute positions and the relative positions of the variable masks 24a and 24b, it becomes possible to block the separated light beams S1 and S3 by allowing only separated light beam S2, which is the object of measurement, to pass.

Both of the side lobes and the scattered component in the perpendicular direction which try to pass through the gap between the variable masks 24a and 24b, can be blocked by the composite masks 24c and 24d. More precisely, the optical intensity distributions of each of the separated light beams S1 to S3 in the perpendicular direction are as shown in FIG. 5. In this direction, although side lobes of the separated light beams S1 and S3 are present, it becomes possible to block the side lobes of the separated light beams S1 and S3 and allow only separated light beam S2, which is the object of measurement, to pass by adjusting the absolute positions and the relative positions of the composite masks 24c and 24d.

As explained above, according to the confocal scanning microscope provided with the spectroscope 20 of the present embodiment, it is possible to restrict the region through which light can pass, in both the spectrum direction and the perpendicular direction. In addition, it becomes possible to suppress the mixing of the side lobes and scattered component into the separated light beam having the wavelength that is the object of measurement. Therefore, in both the spectrum direction and the perpendicular direction, because it is possible to reduce the capture of the side lobes and scattered component, it becomes possible to attain an S/N ratio that is higher than to a conventional one.

In the present embodiment, by making the small aperture 21a1 a square and making its inclination as described above, it is possible to limit the distribution of the side lobes in two linear directions, and at the same time minimize the number in the extended direction thereof. Furthermore, it is possible to block the side lobes based on knowledge of their distribution using the variable masks 24a and 24b and the composite masks 24c and 24d. Therefore, attainment of a higher S/N ratio becomes possible because it is possible to reduce more reliably the capture of the side lobes.

In the present embodiment, the driving device that can adjust the absolute positions of the variable masks 24a and 24b and the composite masks 24c and 24d is provided. Therefore, even if the variable masks 24a and 24b and the composite masks 24c and 24d become relatively misaligned with respect to the separated light beam having the wavelength to be extracted for some reason such as the replacement of the optical system in the spectroscope 20, by moving the absolute positions of the variable masks 24a and 24b and the composite masks 24c and 24d by using this driving device, it becomes possible to adjust easily the relative positions therebetween such that the separated light beams other than the spectrum beam S2 having the desired wavelength are blocked. Because aligning the relative positions is important, the way of the alignment is not only limited to moving only the position of the variable masks 24a and 24b and the composite masks 24c and 24d sides, but can be done by moving the illumination positions of each of the separated light beams by adjusting both of them.

Figure 6:
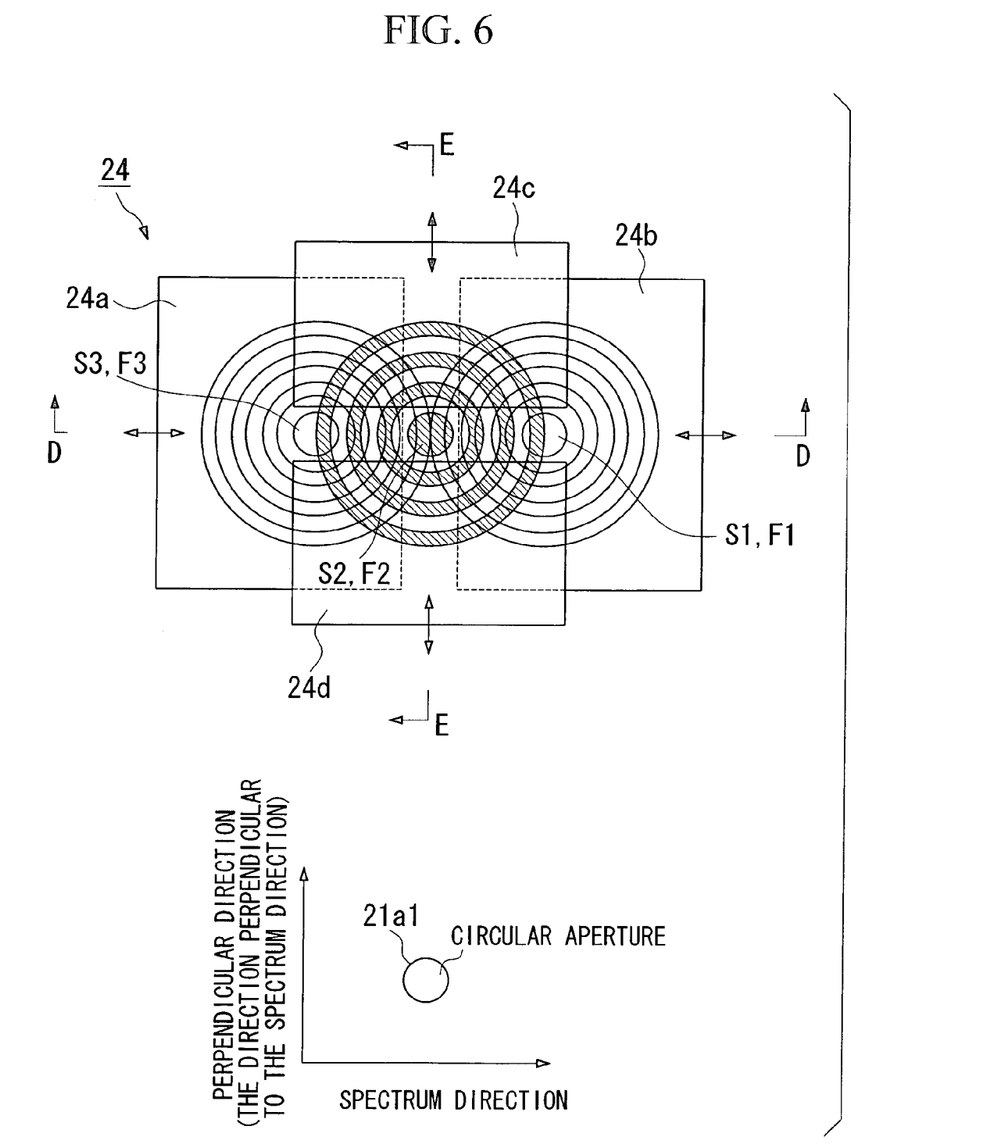
FIG. 6 is a drawing showing a second embodiment of the confocal scanning microscope providing a spectroscope of the present invention. The upper drawing shows the incident light intensity distribution when a circular shape is used for shape of the small aperture, and shows the distribution pattern when the masking apparatus is viewed along the line of a light path. The lower drawing is an explanatory drawing for explaining this small aperture shape.
Figure 7:
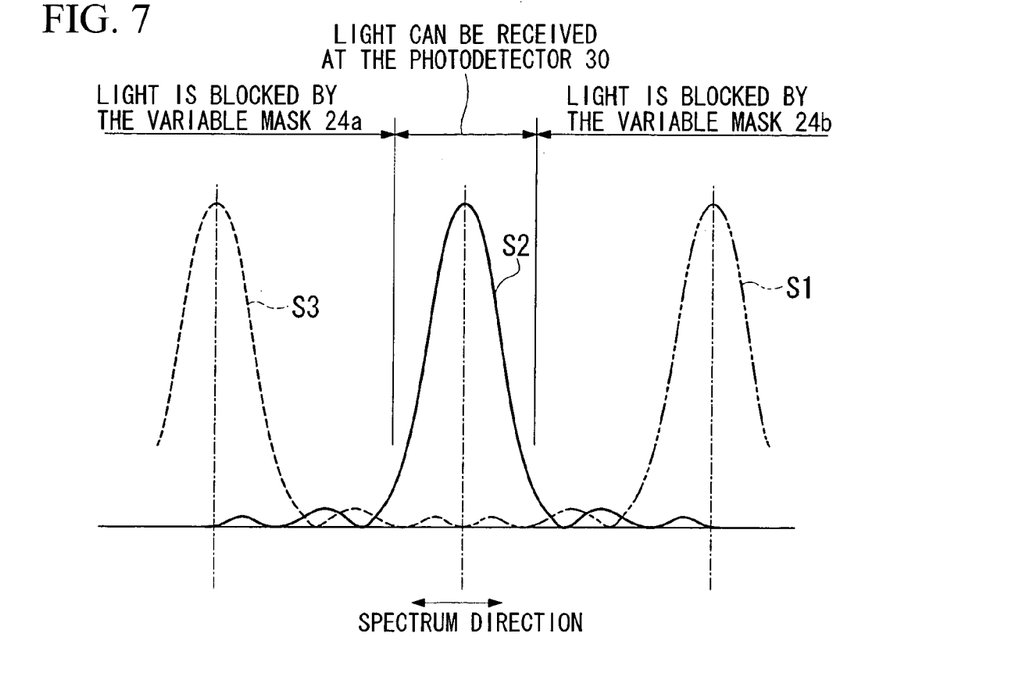
FIG. 7 is a drawing showing the same distribution pattern of the same spectroscope when viewed on the cross-section D—D in FIG. 6.
Figure 8:
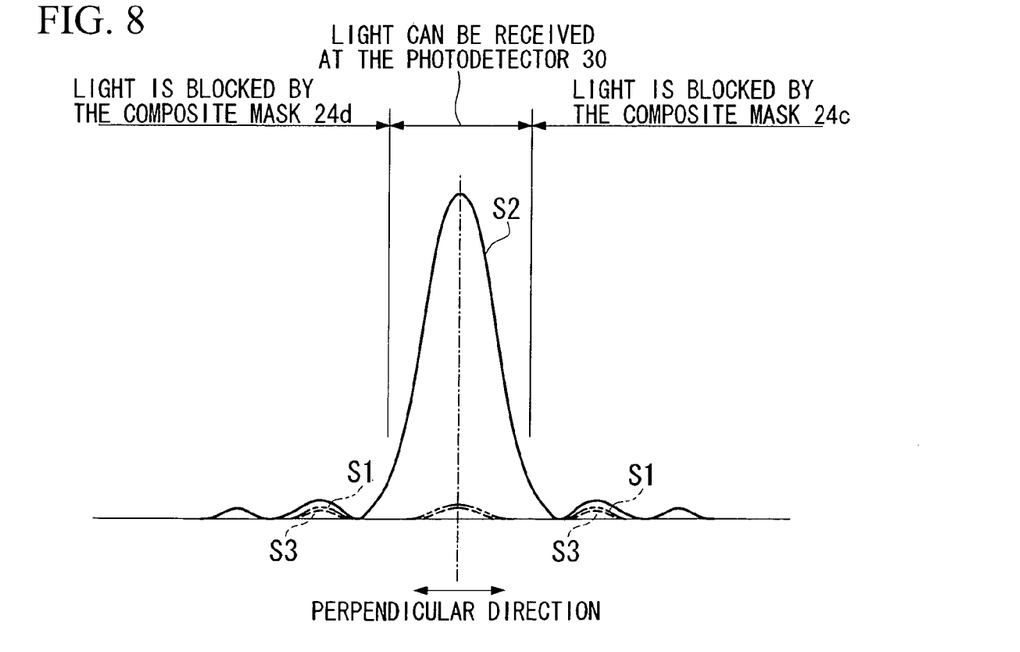
FIG. 8 is a drawing showing the same distribution pattern of the same spectroscope when viewed on the cross-section E—E in FIG. 6.

Next, a second embodiment of a confocal scanning microscope providing a spectroscope of the present invention will be explained in the following with reference to FIG. 6 to FIG. 8. In FIG. 6, the upper drawing shows the incident light intensity distribution when the small aperture shape has a circular shape, and shows the distribution pattern when the masking apparatus is viewed along the line of the light path. In FIG. 6, the lower drawing is an explanatory drawing for explaining this small aperture shape. FIG. 7 is a drawing showing the same distribution pattern when viewed at the cross-section D—D in FIG. 6. FIG. 8 is a drawing showing the same distribution pattern when viewed at the cross-section E—E in FIG. 6.

In comparison to the first embodiment described above, the present embodiment differs in particular on the point that a circular shape is used for the small aperture 21a1 instead of the square shape. Therefore, in the following explanation, the point of difference with the first embodiment described above will be explained in detail, and the explanation of the other aspects is omitted, as they are identical to the first embodiment described above.

As shown in FIG. 6, in the case that the shape of the small aperture 21a1 is a circle, the pattern of the side lobes of each of the separated light beams S1 to S3 incident on the masking apparatus 24 form concentric circles centered on the respective focal point positions F1 to F3 (main spot positions). The incident intensity distributions of the separated light beams S1 to S3 have optical intensities that are highest at the respective focal point positions F1 to F3, and the side lobes, whose optical intensity rapidly reduces towards the periphery, are present in the shape of concentric circles.

In the case of the present embodiment, by providing a masking apparatus 24, it is possible to reduce both the main spots of the separated light beams S1 and S3, which are not objects of measurement, and the side lobes thereof, along with the scattered component in the spectrum direction by blocking them with the variable masks 24a and 24b. More precisely, the optical intensity distribution of each of the separated light beams S1 to S3 in the spectrum direction is as shown in FIG. 7, and the main spots of the separated light beams S1 and S3 and the side lobes are arranged adjacent to the separated light beam S2 which is the object of measurement. By adjusting the absolute positions and the relative positions of the variable masks 24a and 24b, it becomes possible to block most of the separated light beams S1 and S3 by allowing only the separated light beam S2, which is the object of measurement, to pass.

Conventionally, it has not been possible to block side lobes and the scattered component in the perpendicular direction that pass through the gap between the variable masks 24a and 24b. In contrast, in the present embodiment, because they can be blocked by the composite masks 24c and 24d, it is possible to attain an S/N ratio higher than the conventional one.

More precisely, the optical intensity distributions of each of the separated light beams S1 to S3 in the perpendicular direction are as shown in FIG. 8. In this direction as well, although side lobes of the separated light beams S1 and S3 are present, by adjusting the absolute positions and relative positions of the composite masks 24a and 24b, it becomes possible to block most of the separated light beams S1 and S3 by allowing passage of only the separated light beam S2, which is the object of measurement.

In the present embodiment, as shown in FIG. 7 and FIG. 8, the side lobes of the separated light beams S1 and S3 are, although only slightly, mixed into the main spot of the separated light beam S2. As described above, these side lobes do not cause a drastic deterioration of the S/N ratio because the optical intensity is rapidly reduced depending on the distance from the position of this main spot in the radial direction. However, in the case that an even higher S/N ratio is required, like the first embodiment described above, the shape of the small aperture 21a1 is preferably made a square.

Figure 9:
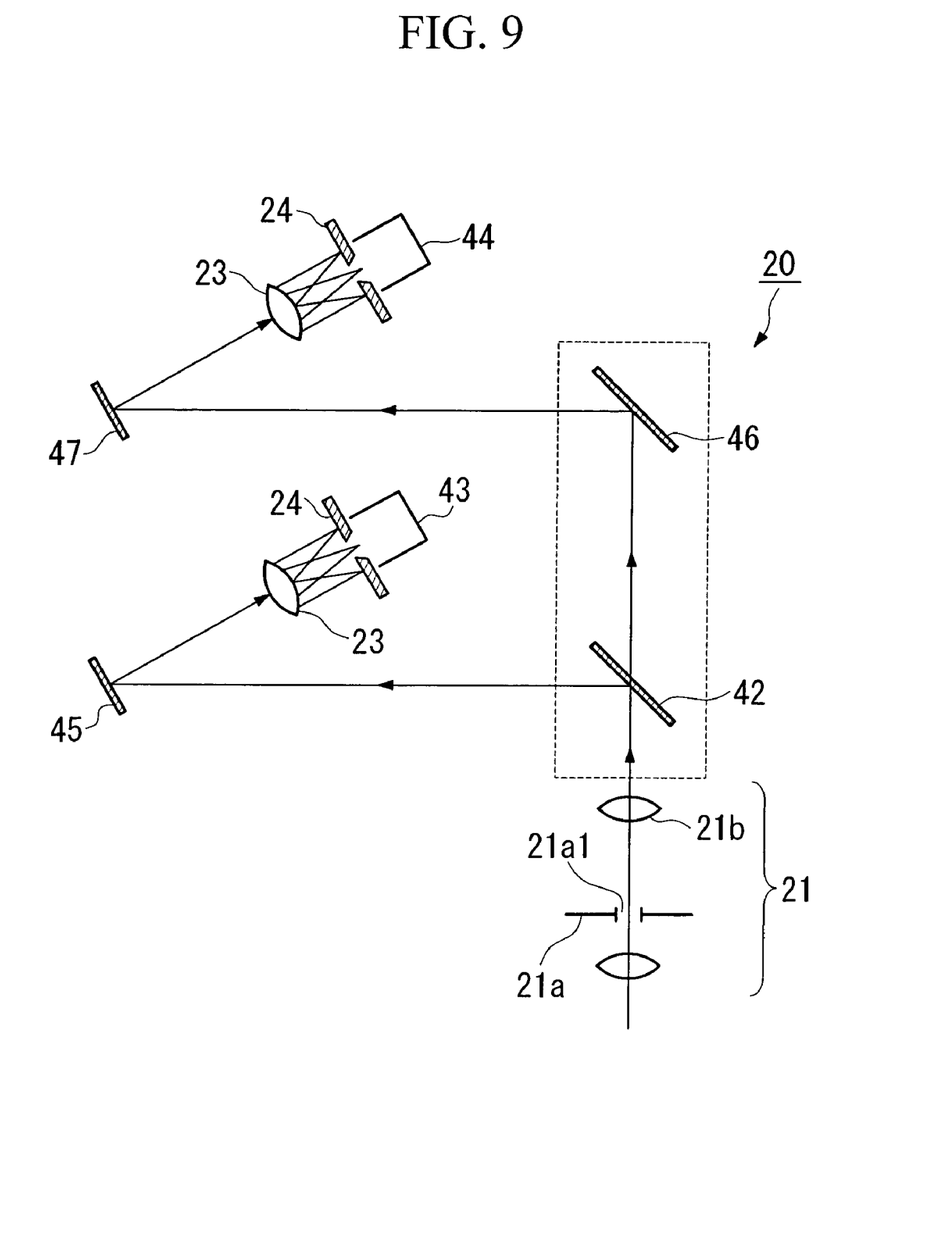
FIG. 9 is a drawing showing a third embodiment of a confocal scanning microscope providing a spectroscope of the present invention, and is an explanatory drawing of the essential components of the device arrangement along the light path.

Next, a third embodiment of a confocal scanning microscope providing a spectroscope of the present invention will be explained in the following with reference to FIG. 9. FIG. 9 is an explanatory drawing of a part of a device arrangement along the light path, and shows the light path downstream of the confocal optical system 21.

The present embodiment differs from the first embodiment described above in particular on the point of having a structure wherein the light beam downstream of the confocal optical system 21 is split into light beams having a plurality of wavelength bands (in the figure, the case in which the light beam is divided into two beams is shown, but of course, it can be split into three or more beams), and these are received by a plurality of photodetector devices 43 and 44.

The light beam (fluorescent light) that has passed though the confocal optical system 21 is incident on the dichroic mirror 42, the light beam having a wavelength that is shorter than a predetermined wavelength is reflected, and thereby the plane grating 45 is illuminated. The light having a wavelength that is longer than a predetermined wavelength propagates to the mirror 46 after having passed through the dichroic mirror 42, is then reflected, and thereby illuminates the plane grating 47. The separated light beams resolved by the plane grating 45 pass through the lens (system) 23, then only the desired separated light beam is allowed to pass by the masking apparatus 24, and this separated light beam is received by the photodetector device 43. Also, the separated light beams resolved by the plane grating 47 pass through the another lens (system) 23, then only the desired separated light beam is allowed to pass by the another masking apparatus 24, and this separated light beam is received by the photodetector device 45.

In the present embodiment as well, by providing the masking apparatus 24 in front of each of the photodetector devices 43 and 44, in both the spectrum direction and the perpendicular direction, it is possible to attain a higher S/N ratio than conventionally because it is possible to reduce the capture of the side lobes and scattered component.

In addition, the masking apparatus 24 provides the above-mentioned driving device, and thus, for example, compensation can be easily carried out even when deviations in the focal point positions of each of the separated light beams occur due, for example, to the replacement of the dichroic mirror 42.

The spectroscope 20 in the first embodiment to the third embodiment described above has a light trap cloth (reflection preventing constitution) attached on the shielding surface on both of the variable masks 24a and 24b and the composite masks 24c and 24d that are impinged on by each of the separated light beams S1 to S3 as a measure to prevent the light blocked by the masking apparatus 24 from becoming a scattered component due to being reflected. Due to the light trap cloth, it is possible to suppress the light that is reflected from the shielding surface to the lens (system) 23. Thereby, it becomes possible to effectively stop the returning scattered component from impinging on the lens (system) 23. Note that instead of the light trap cloth, it is possible to treat the shielding surface with the application of an unpolished black coating.

In the spectroscope 20 of the first embodiment to the third embodiment, the shape of the last surface (the surface facing to the shielding surface) of the lens (system) 23 that is adjacent to the variable masks 24a and 24b and the composite masks 24c and 24d has a convex surface that becomes convex towards the variable masks 24a and 24b and the composite masks 24c and 24d, and this also makes possible suppressing the reduction of the S/N ratio due to the capture of the scattered component.

Figure 10:
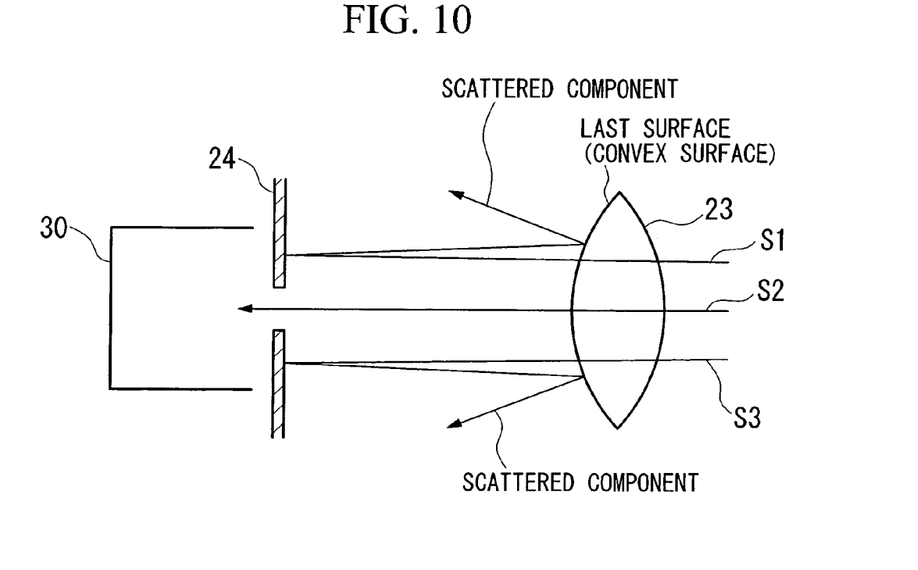
FIG. 10 is a drawing for explaining reflection preventing constitution which can be preferably used for the first embodiment through the third embodiment of the confocal scanning microscope providing the spectroscope of the present invention, and is an explanatory drawing viewed on a cross-section parallel to the spectrum direction.

This will be explained with reference to FIG. 10. Even if the light blocked by the masking apparatus 24 is reflected towards the last surface of the lens (system) 23, this last surface has a convex shape, and thus it is possible to reflect this light so that it will not return to the masking apparatus 24. Therefore, it becomes possible to prevent the light reflected at the lens (system) 23 (the separated light beams having other wavelengths, side lobes, scattered light) from being captured in the main spot of the separated light beam that is the object of measurement.

Figure 11:
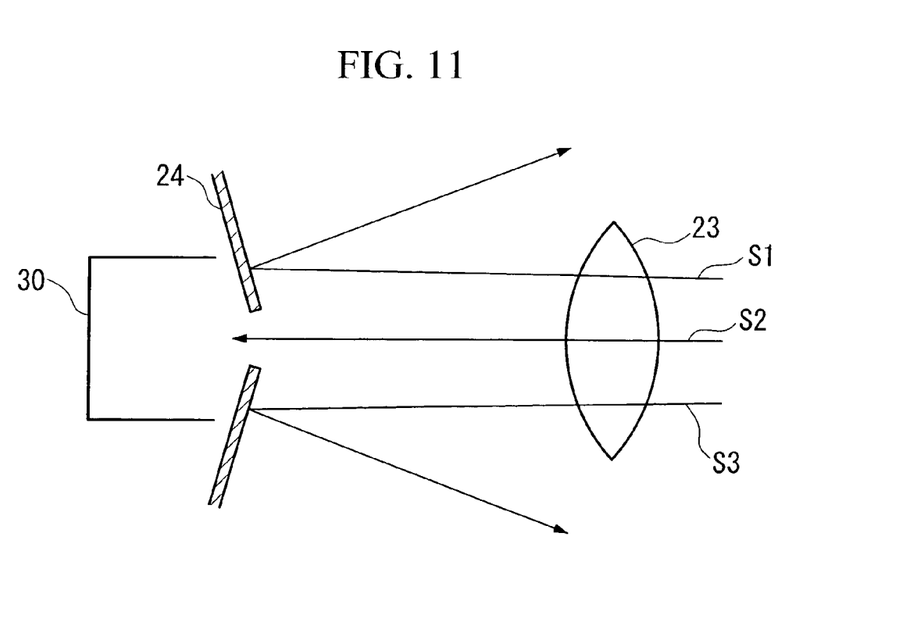
FIG. 11 is a drawing for explaining another reflection preventing constitution which can be preferably used for the first embodiment through the third embodiment of the confocal scanning microscope providing the spectroscope of the present invention, and is an explanatory drawing viewed on a cross-section parallel to the spectrum direction.

Furthermore, it is possible to use, for example, the device shown in FIG. 11 as a device for preventing a lowering of the S/N ratio due to capturing the scattered component. In the case of this figure, the shielding surface (the shielding surface of the variable masks 24a and 24b and composite masks 24c and 24d on which each of the separated light beams impinge) of the masking apparatus 24 is slanted so as to avoid being opposed to the lens (system) 23, which is the optical system adjacent to this shielding surface. According to this structure, the light that impinges on the slanted shielding surface is reflected in a direction away from the lens (system) 23 that is adjacent to this shielding surface. According to this structure, it becomes possible to prevent the light (separated light beams having other wavelengths, side lobes, and the scattered component) blocked by the shielding surface from being reflected towards the emitting side of each of the separated light beams, then being reflected back, and then being captured in the main spots of the separated light beam that is the object of measurement.

In the first embodiment through the third embodiment, these examples were explained for the case in which the spectroscope of the present invention is applied to a confocal scanning microscope. However, this is not limiting, and of course the spectroscope of the present invention can be applied to other spectroscopic uses.

The structure, operation, and effects of the present invention can be summarized as follows.

The spectroscope of the present invention uses a structure that provides a mask that limits the transmission area of each of the separated light beams in the spectrum direction and a mask that limits the transmission area of each of the separated light beams in the perpendicular direction when viewed against each of the separated light beams, where the spectrum direction is the direction of the arrangement of these separated light beams.

According to this structure, among the resolved separated light beams, both the main points and the side lobes of the separated light beams that are not objects of measurement, along with the scattered component, can be blocked by the masks that limit the transmission area in the spectrum direction. Furthermore, it is possible to block the side lobes and scattered component that try to avoid and pass through the masks in the perpendicular direction by the mask that limits the transmission area in the perpendicular direction.

Therefore, from both the spectrum direction and the perpendicular direction, the area through which the light can be transmitted can be reduced, and thus it is possible to suppress the mixing of side lobes and scattered component into the separated light beam having the wavelength that is the object of measurement. Thereby, the effect can be obtained that it becomes possible to attain an S/N ratio that is higher than the conventional one.

This spectroscope may adopt a constitution that it provides a square-shaped small aperture that focuses a light beam before resolution, and the direction of one of the diagonals of the small aperture and the spectrum direction are parallel to each other.

In this case, because the shape of the small aperture is square, when the distribution of the side lobes in each of the separated light beams is viewed in a cross-section perpendicular to these separated light beams, they can be distributed so as to be slanted in the spectrum direction and arranged in two linear directions that intersect each other. Furthermore, because the direction of one of the diagonal lines of this square and the spectrum direction are parallel, when viewed against the line of the light path of each of the separated light beams, the relative inclination of the direction of the arrangement of each of the separated light beams and the masks that limit the transmission area in the spectrum direction can be aligned. Therefore, it is possible to prevent the side lobes of the separated light beams adjacent to the separated light beam that is to be extracted, from being superimposed on the position of the main spot (positioned at the intersection point of the two straight lines formed by the side lobes) of the separated light beam that is to be extracted. Thereby, it is possible to reduce more reliably the capture of the side lobes of the other adjacent separated light beams in the main spot.

Therefore, it is possible to limit the distribution of the side lobes to a plurality of directions and to minimize the number in the extended directions thereof. Furthermore, it is possible to block the light by using each of the masks based on the specified distribution of the side lobes. Thereby, it is possible to attain a higher S/N ratio because the capture of the side lobes can be more effectively reduced.

This spectroscope may uses a structure that provides an adjusting device that adjusts the relative positions of each of the masks and the separated light beams propagating towards these masks.

In this case, even if a misalignment of the relative positions of each of the masks and the separated light beam having the wavelength to be extracted occurs due to some reason such as replacement of the optical system or the like, by using this adjustment device, it is possible to compensate the relative positions therebetween such that the separated light beams not having the desired wavelength are appropriately blocked by moving one or both of the positions of the mask side and the illuminating position side of the separated light beams.

Therefore, even if misalignment of the relative positions of each of the masks and the separated light beam having the wavelength to be extracted occurs, by using this adjusting device, it becomes possible to adjust this misalignment easily.

The spectroscope can also use a structure that provides a reflection preventing constitution on the shielding surface of both or one of the masks that are impinged on by the separated light beams.

In this case, because the light that impinges on the reflection preventing constitution provided on the shielding surface is absorbed without being reflected, it is possible to suppress the scattered component that returns due to being reflected from the shielding surface on the incident side.

Therefore, it is possible to prevent capture of the light (separated light beams having other wavelengths, side lobes, scattered component) blocked by the shielding surface in the main spot of the separated light beam that is the object of measurement due to being reflected towards the emission side of each of the separated light beams and then returning due to reflection.

This spectroscope can use a structure in which the shielding surface of one or both of the masks that is impinged on by each of the separated light beams is slanted so as to avoid being opposed to the optical device adjacent to this shielding surface.

In this case, the light that impinges on the slanted shielding surface is reflected in the direction away from the optical device adjacent to this shielding surface. Thereby, it is possible to suppress the scattered component that returns due to being reflected from the shielding surface.

Therefore, it is possible to prevent capture of the light (separated light beams having other wavelengths, side lobes, scattered component) blocked by the shielding surface in the main spot of the separated light beam that is the object of measurement due to being reflected towards the emission side of each of the separated light beams and then returning due to reflection.

The spectroscope can use a structure in which the lenses are disposed opposite to the adjacent masks and the surface of the lenses opposed to the masks have a convex surface that is convex towards these masks.

In this case, even if the light blocked by each of the masks propagates towards the last surface (the surface facing to each of the masks) of the lens, because the last surface is convex, it is possible to reflect the light so as to prevent its returning to the masks.

Therefore, even if the light blocked and reflected by the masks propagates towards the lenses, because the last surface (the surface opposite to each of the masks) of the lens is convex, it is possible to prevent reflection such that the light returns to the masks. Thereby, it is possible to prevent capture of the light (separated light beams having other wavelengths, side lobes, scattered component) reflected by the lens in the main spot of the separated light beam that is the object of measurement.

The confocal scanning microscope of the present invention is one that resolves a light beam from an object of measurement into separated light beams of various wavelengths, and selects and receives a separated light beam having an arbitrary wavelength from among these separated light beams at a photodetector, and one of the spectroscopes described above is provided between the light paths from the object of measurement towards the photodetector.

According to this structure, it is possible to attain higher measurement precision because the spectroscope used can obtain an S/N ratio that his high in comparison to a conventional one.

What is claimed is:

1. A spectroscope that resolves a light beam into separated light beams having various wavelengths, and selects and extracts a separated light beam having an arbitrary wavelength from among these separated light beams, comprising:
    a first mask disposed such that a transmission area of each of the separated light beams in a spectrum direction is limited; and
    a second mask disposed such that the transmission area of each of the separated light beams in a direction perpendicular to said spectrum direction is limited, where said spectrum direction denotes a direction of the arrangement of these separated light beams when viewed against the line of the resolved separated light beams, wherein:
    said first mask includes a pair of first mask members which are independently movable closer to or further away from each other so as to adjust a first length of said transmission area in said spectrum direction and a first position of said transmission area in said spectrum direction; and
    said second mask includes a pair of second mask members which are independently movable closer to or further away from each other so as to adjust a second length of said transmission area in said direction perpendicular to said spectrum direction and a second position of said transmission area in said direction perpendicular to said spectrum direction.

2. The spectroscope according to claim 1, comprising a square small aperture that focuses said light beam before resolution, wherein a direction of one of diagonals of said small aperture is parallel to said spectrum direction.

3. The spectroscope according to claim 1, comprising an adjustment device that adjusts the relative positions of the pairs of mask members in each of said first and second masks to establish the first and second lengths of said transmission area and the absolute position of said transmission area with respect to the separated light beams that propagate towards these first and second masks to thereby select and extract a separated light beam having an arbitrary wavelength from among these separated light beams.

4. The spectroscope according to claim 1, comprising a reflection preventing means provided on a shielding surface on one or both of said first and second masks on which said separated light beams are impinged.

5. The spectroscope according to claim 1, wherein a shielding surface on one or both of said first and second masks that are impinged by said separated light beams is slanted so as to avoid facing an optical device adjacent to said shielding surface.

6. The spectroscope according to claim 1, wherein:
    lenses disposed in opposition are adjacent to said first and second masks; and
    surfaces of said lenses that are adjacent to said masks have a convex shape that is convex towards these masks.

7. A confocal scanning microscope that resolves a light beam from an observation object into separated light beams of various wavelengths, selects a separated light beam having an arbitrary wavelength from among these separated light beams, and receives the selected separated light beam at a photodetector, comprising:
    the spectroscope according to any one of claim 1 through claim 6 being provided between the light paths from said observation object towards said photodetector.

* * * * *